United States Patent [19]

Soury et al.

[11] 3,844,307

[45] Oct. 29, 1974

[54] GATE VALVE FOR THE TRANSFER OF HIGH PURITY GAS

[75] Inventors: Jean-Pierre Soury, Igny; Andre Lambert, Gif-sur-Yvette; Rene Barandon, Morangis, all of France

[73] Assignee: Societe Generale De Constructions Electriques Et Mecaniques (Alsthom), Paris, France

[22] Filed: May 25, 1972

[21] Appl. No.: 256,649

[30] Foreign Application Priority Data

May 27, 1971 France .................................. 71.19399

[52] U.S. Cl. ............... 137/271, 251/61.4, 251/61.5, 251/335 B
[51] Int. Cl. ..................... F16k 41/10, F16k 31/145
[58] Field of Search ............ 251/335 A, 335 B, 61.5, 251/214; 137/271

[56] References Cited
UNITED STATES PATENTS

| | | | |
|---|---|---|---|
| 1,478,815 | 12/1923 | Blauvelt | 251/335 B |
| 1,983,106 | 12/1934 | Sundstrom | 251/335 B |
| 2,628,638 | 2/1953 | Herod et al. | 251/335 B |

FOREIGN PATENTS OR APPLICATIONS

| | | | |
|---|---|---|---|
| 1,361,534 | 4/1964 | France | 251/335 B |
| 1,924,476 | 11/1970 | Germany | 251/335 B |

*Primary Examiner*—Arnold Rosenthal
*Attorney, Agent, or Firm*—Craig & Antonelli

[57] ABSTRACT

A gate valve for use in the transfer of high purity gases includes a valve closure member disposed in a passage for regulating the gas flow therethrough, a piston gliding in a guide member and connected to the valve closure member and a fluid-tight sealing bellows connected between the piston and the guide member. The guide member is clamped against a sealing ring in the body of the valve assuring the fluid tightness between the inner volume of the body of the gate valve and the control head of the piston. The surfaces of the parts of the valve which are in gliding contact or threaded engagement with other parts are all disposed on the side of the fluid-tight sealing bellows or the sealing ring opposite the inner volume of the body of the gate valve.

8 Claims, 4 Drawing Figures

GATE VALVE FOR THE TRANSFER OF HIGH PURITY GAS

The present invention relates in general to valve constructions, and more particularly to a gate valve which may be used in a conduit system for the transfer of high purity gas.

In certain industrial applications it is necessary to transfer a high purity gas from one location to another, such as between a source and a particular apparatus or between spaced work locations; however, great care must be taken in effecting such transfer to ensure that the purity of the gas is maintained. The conduit which carries the gas can be cleaned by preliminary scavanging or flushing with a pure gas, but some difficulty is often encountered in eliminating contaminants from such items as the valves which are connected to the ducts due to the mechanical construction thereof.

The prior art gate valves for manual or automatic, and particularly for pneumatic high purity gas ducts or lines, comprise either a control head incorporated in the body of the valve or a piston which is disposed within the inner volume of the fluid-tight sealing bellows and glides in a guide with the portion thereof that is closest to the closing member, such as a flap valve. However, even if all of the inner surfaces thereof are made from materials which are inert with respect to the gas to be transferred, this will not completely eliminate the pollution of this gas, since it is practically impossible by simple scavenging or flushing with a pure gas to eliminate the impurities which have been absorbed on the inner surfaces of the valve or the residual volumes of a different gas that has previously circulated in the gate valve. This is so particularly because the scavenging gas cannot circulate in the remote zones of the valve passage which may be blocked by means of the valve closure member, especially if they are connected with the valve passage only by virtue of the play existing between the male and female parts of a thread or between a piston and the guide thereof. Furthermore, the fluid-tightness or sealing effect thereof with respect to the ambient atmosphere is not always sufficient inasmuch as they generally comprise seals, membranes, ect., which allow for a certain diffusion of the gas from one side thereof to the other.

It is the object of the present invention to obviate the aforementioned disadvantages and drawbacks and to provide for gate valves designed for use in high purity gas ducts or lines which, prior to being put into operation or service, may undergo a treatment for the elimination of impurities by scavenging with the aid of a pure gas and which further display a behavior in vacuo better than $10^{-6}$ atm/cm$^3$/sec, so as to prevent any diffusion of the ambient atmosphere in the gas to be transferred.

The gate valve according to the present invention is characterized in that the surfaces of the pieces or parts which are subjected to either gliding contact or threaded engagement with respect to other pieces or parts are all disposed on the side of the fluid-tight sealing bellows or the sealing ring opposite the inner volume of the body of the gate valve. Moreover, the valve of the present invention has preferably at least one of the following characteristics:

1. The guide for the piston which operates the closure member is equipped with a flange which is fastened or clamped against a toric sealing ring by means of a threaded ring which is screwed into an extension of the body of the gate valve.

2. The means which allow for a translation of the control head with respect to the body of the gate valve also make possible the removability thereof, and it comprises at least one manual control head and one pneumatic control head which may be substituted for each other.

The present invention provides a gate valve designed for the transfer of high purity gas, comprising a valve closure member disposed in a passage and driven by a piston gliding within a guide connected to the piston by means of a fluid-tight sealing bellows. The guide for the piston is tightened or clamped against the body of the gate valve with the interposition of a sealing ring.

A control head for the piston is connected to the body of the gate valve by means which allow for a translation of the control head with respect to the body of the valve, the sealing ring separating the inner volume of the body of the gate valve from the inner volume of the control head. The present invention is applicable, more particularly, to the transfer of a gas whose impurity ratio is sought to be kept at an extremely low value, in the order of $10^{-7}$ of the volume per million, or below.

Prior to being put into operation or service for the transfer of high purity gas, the gate valve undergoes a treatment of polishing of the inner surface thereof and a decontamination treatment.

Described hereinafter in further detail by way of example and with reference to the accompanying drawing is a gate valve according to the present invention which may be provided with a manual control head, a pneumatic control head of the "normally open" type, and a pneumatic control head of the "normally closed" type.

Figure 1:
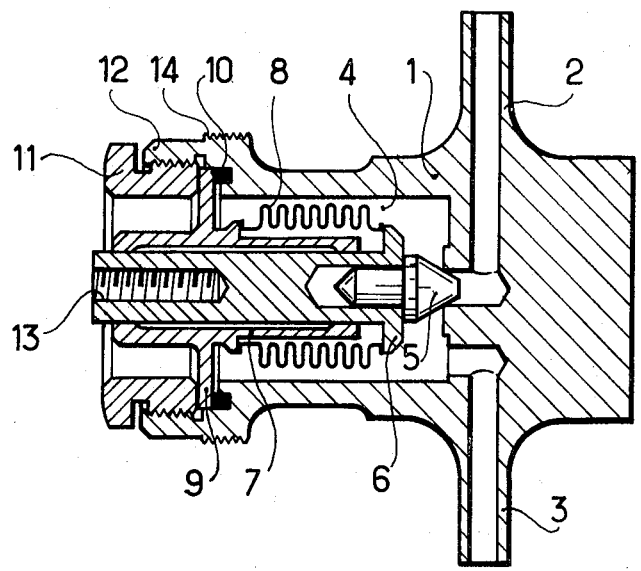
FIG. 1 is a longitudinal sectional view of a gate valve body with the control head being removed.

The gate valve body illustrated in FIG. 1 comprises a valve block 1 having two connecting pipe branches or ducts 2 and 3 formed therein for the inflowing and for the outflowing gas. The body of the gate valve, or at the very least the inner surface of the chamber 4 thereof, is made from steel, metal or an unoxidizable alloy, for example from polymonochlorotrifluorethylene, or any other polymer having analogous characteristics with regard to mechanical strength, chemical inertness, and behavior in vacuo.

In the body of the valve, a needle valve stopcock 5 made from polymonochlorotrifluorethylene is embedded forcibly in a bore in the head of the piston 6 and serves as a valve closure member to assure the closing of the orifice connecting the duct 2 with the chamber 4. This needle valve stopcock 5 is carried by a piston 6, which is made from stainless steel and glides within a guide 7. The fluid-tightness or seal between the piston 6 and the guide 7 is assured by virtue of a bellows 8 made of stainless steel and secured at one of the ends thereof to a shoulder portion of the piston and at the other end thereof to a shoulder portion of the guide 7.

The guide 7 includes a flange 9 which is clamped by a ring 11 against a ring or seal 10 made from polytetrafluorethylene and disposed in a groove or channel provided for in a shoulder portion of the body 1. The threaded brass ring 11 is screwed into a tapped extension 12 of the body 1. The end of the piston opposite the needle valve stopcock 5 is provided with an internally threaded bore 13 which makes it possible to engage a threaded control rod of a control head to the piston so as to effect movement of the piston in accordance with the displacements of the control rod. Finally, the body 1 is equipped with an external thread 14 which makes it possible to threadedly engage the body 1 with a control head, such as one of those which will be described hereinbelow.

The inner surface of the chamber 4 is subjected to a decontamination treatment in order to eliminate therefrom any impurities which might have been absorbed therein, and this decontamination treatment is carried out for example by means of an extended scavenging with a stream of very pure gas, in a manner that is known per se.

Figure 2:
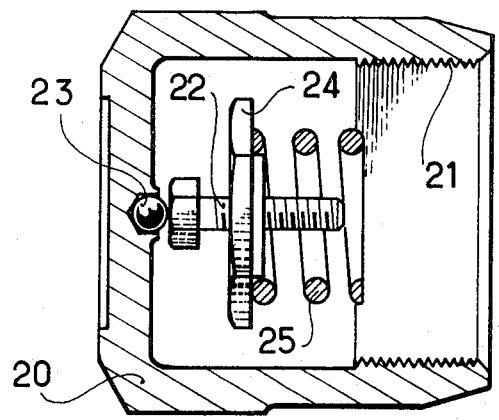
FIG. 2 is a sectional view of a manual control head which is adaptable to the gate valve body shown in FIG. 1.

The manual control head shown in FIG. 2 is composed of an internally bored body 20 made from an alloy of aluminum and copper, comprising approximately 94.5 percent aluminum, 4 percent copper, 0.5 percent manganese, 0.5 percent magnesium and 0.5 percent silicon by weight, of the type sold under the trademark "Duralumin." The body 20 is equipped on the side opposite the bottom thereof with an internal screw thread 21 having a diameter and pitch corresponding to that of the external thread 14 of the body of the gate valve. Inside this body 20, the control rod 22 consisting of brass which rests upon the bottom of the bore of the body against a small ball 23 extends through a flat screw 24, also made of brass, which serves to maintain a helicoidal steel spring 25 supported against the flange 9 of the body of the gate valve.

The rod 22 is provided with a thread having a diameter and pitch corresponding to that of the internally threaded bore 13 of the body of the gate valve in such a manner as to lock the rod within the piston and to thereby allow for the control of the latter. It is apparent that, once the head is engaged on the body of the gate valve shown in FIG. 1, any rotation of this head in the direction of a more forceful engagement will carry along the needle valve stopcock 5 in the closing direction, and a rotation of this head in the direction to cause unscrewing thereof from the body 1 carries the needle valve stopcock 5 along in the opening direction.

Figure 3:
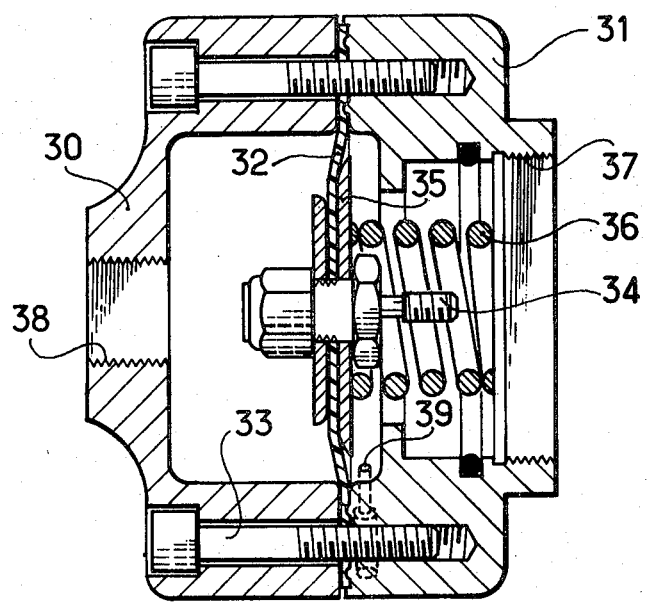
FIG. 3 is a sectional view of a pneumatic control head of the "normally open" type which is adaptable to the gate valve body shown in FIG. 1.

The pneumatic control head illustrated in FIG. 3 is composed of two annular parts 30 and 31 enclosing the periphery of an elastic membrane 32 made from linen-type or India canvas neoprene rubber and connected or joined by screws 33. The threaded rod 34 carried by the plate 35 disposed in contact with one surface of the membrane is designed to assure proper positioning and alignment so as to facilitate the junction of the head with the piston 6 by threaded engagement of the rod 34 in the tapped bore 13 thereof. The plate 35 additionally allows for the support of a helicoidal steel spring 36 which is designed to bear against the flange 9 of the guide of the piston. The part 31 of the head also comprises a tapped bore 37 having a diameter and pitch corresponding to that of the external thread 14 of the body of the gate valve, thereby making it possible to screw the head onto the latter.

In the position of rest, the spring 36 pushes the membrane 32 back and consequently removes or separates the needle valve stopcock 5 from the seat thereof, keeping the gate valve in the open position. When it is desired to close it, one introduces through the threaded bore 38 a gas under pressure which exerts a force against the face of the membrane opposite the spring, having the effect of compressing the spring and of pushing the needle valve stopcock of the gate valve back onto its seat. A vent or gas port 39 evacuates the excess gas on the spring side of the membrane.

Figure 4:
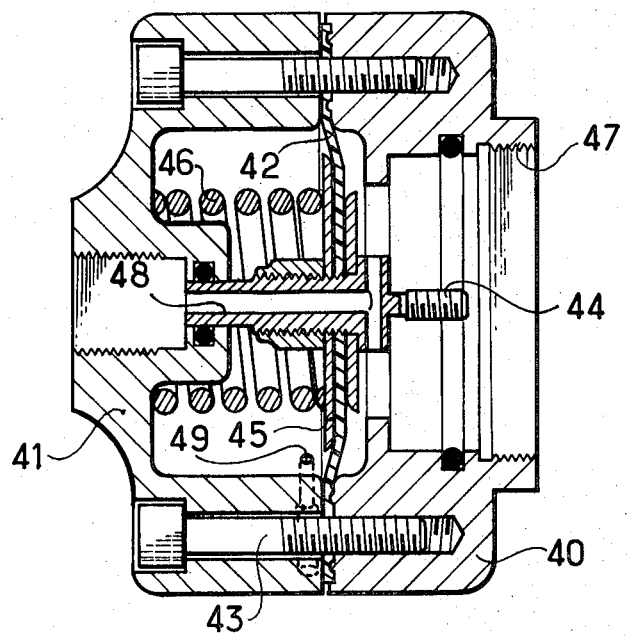
FIG. 4 is a sectional view of a pneumatic control head of the "normally closed" type which is adaptable to the gate valve body shown in FIG. 1.

The pneumatic control head shown in FIG. 4 is composed in a manner analogous to the embodiment of FIG. 3, namely of two annular parts 40 and 41 enclosing the periphery of a membrane 42 and connected by means of screws 43. The threaded rod 44 carried by the plate 45 disposed in contact with one surface of the membrane 42 is designed to assure proper positioning and alignment so as to facilitate the junction of the head with the piston 6 by threaded engagement of the rod 44 in the tapped bore 13 thereof. The plate 45 carries a helicoidal spring 46 disposed on the side opposite that of the threaded rod, which spring is supported against the bottom of the part 41 of the head. The part 40 of the head comprises a tapped bore 47 making it possible to engage it with the external thread 14 of the body of the gate valve.

In the position of rest, the membrane 42 is pushed back by the spring 46 and thereby keeps the gate valve in the closed position, the needle valve stopcock 5 being applied against the valve seat. When it is desired to open the valve, a gas under pressure is introduced through the duct 48 so as to exert a force against the face of the membrane 42 opposite the spring 46. The spring 46 is compressed and the membrane 42 becomes displaced, thus separating the needle valve stopcock 5 from the seat thereof. A vent or gas port 49 evacuates the excess gas on the spring side of the membrane.

Even though the structure of the gate valve which has been described hereinabove is preferred, it is understood that various modifications may be made thereto without departing from the spirit and scope of the present invention. Thus, specific elements thereof may be replaced by other elements which will perform in the same technical manner. More particularly, the gate valve need not necessarily be one having a needle valve stopcock, but it could have for example a flap valve. For purposes of automatic control, the head may be hydraulic rather than pneumatic. The gate valve may comprise, for example, three paths with two control heads, or four paths with three control heads. The connections with the ducts 2 and 3 may be brazed upon the latter, but preferably they are equipped with known connectors for withstanding a high vacuum.

What is claimed is:

1. A gate valve for the transfer of a high purity gas, comprising a valve body having a gas passage communicating with an inner chamber, a closure member disposed in said inner chamber for selective engagement in said gas passage to open and close said passage, a piston having an elongated body and an outwardly extending annular flange at one end thereof which is secured to said closure member, a guide member mounted in said valve body having said piston glidingly disposed therein and including a projecting portion guiding said one end of said piston, a sealing ring disposed between said guide member and said valve body, clamping means for clamping said guide member against said sealing ring, means for moving said piston, and a fluid-tight sealing bellows surrounding said projecting portion of said guide member and being connected between said one end of said annular flange of said piston and said guide member so that said closure member in said inner chamber is effectively isolated by said sealing ring and said bellows from the contacting surfaces of said piston and said guide member and from said clamping means, wherein said means for moving said piston includes a hollow adjusting member, a diaphragm disposed in said adjusting member to define a chamber on at least one side thereof, and a control rod secured to said diaphragm and coupled to the end of said piston opposite said closure member, said adjusting member being secured to said valve body and having a pressure inlet passage for introducing a gas under pressure into said chamber thereof to effect movement of said control rod and said piston, thereby regulating the position of said closure member.

2. A gate valve for the transfer of a high purity gas, comprising a valve body having a gas passage communicating with an inner chamber, a closure member disposed in said inner chamber for selective engagement in said gas passage to open and close said passage, a piston having one end thereof secured to said closure member, a guide member mounted in said valve body having said piston glidingly disposed therein, a sealing ring disposed between said guide member and said valve body, clamping means for clamping said guide member against said sealing ring, means for moving said piston, and a fluid-tight sealing bellows connected between said one end of said piston and said guide member so that said closure member in said inner chamber is effectively isolated by said sealing ring and said bellows from the contacting surfaces of said piston and said guide member and from said clamping means, said guide member being provided with an annular flange contacting said sealing ring, and said clamping means being provided in the form of a threaded ring engaging in a tapped opening in said valve body and bearing against the annular flange of said guide member.

3. A gate valve according to claim 2 wherein said means for moving said piston includes a cup shape adjusting member threadedly engaging with said valve body in axial alignment with said piston and a control rod mounted in said adjusting member and coupled to the end of said piston opposite said closure member so that adjustment of said adjusting member on said valve body will produce displacement of said piston.

4. A gate valve according to claim 3 wherein a spring member is interposed between said control rod and the annular flange of said guide member to bias said piston via said control rod and said closure member into an open valve position.

5. A gate valve according to claim 2 wherein said means for moving said piston includes a hollow adjusting member, a diaphragm disposed in said adjusting member to define a chamber on at least one side thereof, and a control rod secured to said diaphragm and coupled to the end of said piston opposite said closure member, said adjusting member being secured to said valve body and having a pressure inlet passage for introducing a gas under pressure into said chamber thereof to effect movement of said control rod and said piston, thereby regulating the position of said closure member.

6. A gate valve according to claim 5 wherein said chamber in said adjusting member is disposed on the side of said diaphragm opposite said piston and a spring member is positioned between said diaphragm and the annular flange of said guide member to bias said piston via said control rod and said closure member into an open valve position.

7. A gate valve according to claim 5 wherein said chamber in said adjusting member is disposed on the side of said diaphragm facing said piston and a spring member is in contact with the opposite side of said diaphragm to bias said piston via said control rod and said closure member into a closed position.

8. A gate valve according to claim 7 wherein said pressure inlet passage extends through said control rod.

* * * * *